G. T. SAMPSON.
BICYCLE ATTACHMENT.
APPLICATION FILED DEC. 3, 1908.

947,945.

Patented Feb. 1, 1910.

Witnesses

Inventor
Geo. T. Sampson
By R. J. McCarty
his Attorney

UNITED STATES PATENT OFFICE.

GEORGE T. SAMPSON, OF DAYTON, OHIO.

BICYCLE ATTACHMENT.

947,945.  Specification of Letters Patent.  Patented Feb. 1, 1910.

Application filed December 3, 1908. Serial No. 465,767.

*To all whom it may concern:*

Be it known that I, GEORGE T. SAMPSON, citizen of the United States, residing at Dayton, in the county of Montgomery and State of Ohio, have invented certain new and useful Improvements in Bicycle Attachments; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a bicycle attachment by means of which a two wheeled vehicle may be attached to the rear of a bicycle and a person conveyed thereon with no effort on the part of such person to propel the vehicle.

The attachment will be hereinafter more fully described in connection with the accompanying drawings, of which—

Figure 1:
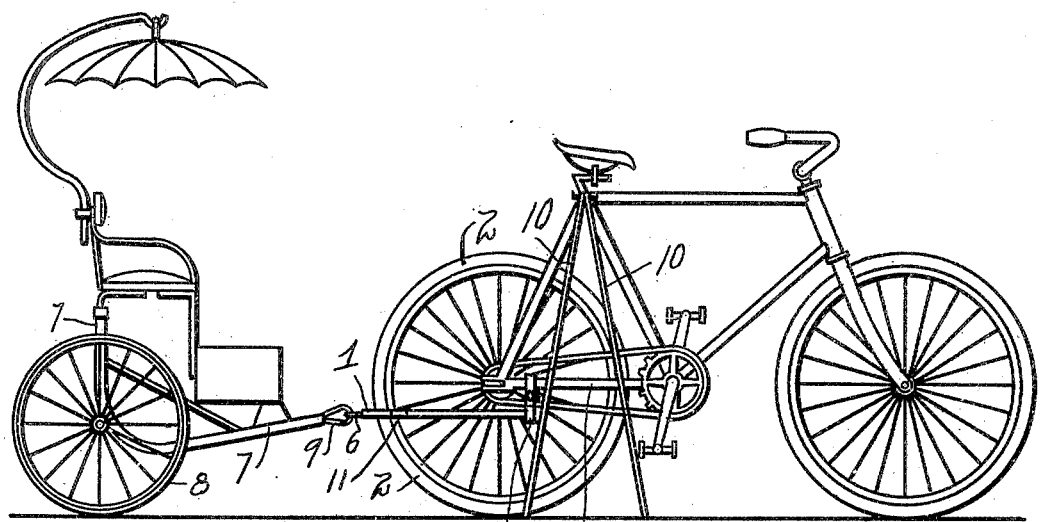
Figure 2:
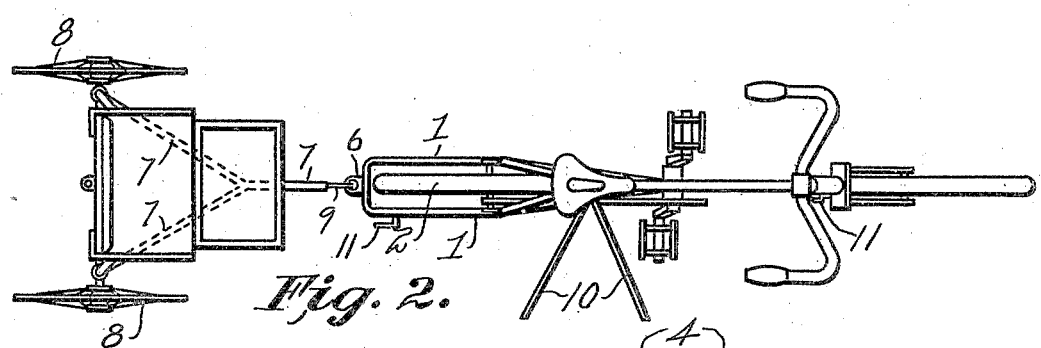
Figure 3:
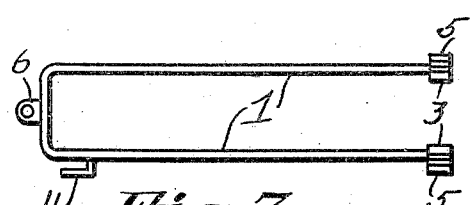
Figure 4:
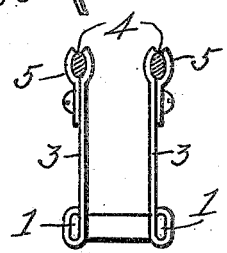

Figure 1, is a side elevation of the combination vehicle. Fig. 2, is a top plan view. Fig. 3, is a detached enlarged plan view of the coupling fork. Fig. 4, is a detached elevation of the forward upright portions of said coupling fork.

In a detail description of the invention, similar reference characters indicate corresponding parts.

Fig. 1 illustrates a bicycle and a two wheeled vehicle in side elevation. The bicycle is of a well-known type and the two wheeled vehicle is designed for the conveyance of a person thereon from the power generated by the rider of the bicycle. The auxiliary vehicle is especially designed for children or invalids, but of course may be used by others.

1 designates a coupling fork which straddles the rear wheel 2 of the bicycle and the forward ends of which extend in upright depending arms 3. These upright arms are rigidly secured to the rear horizontal forks 4 of the bicycle in advance of the axle of the rear wheel by means of clamps 5 which embrace the outer sides of said rear horizontal forks and rigidly clamp the coupling fork 1 to the bicycle frame. The rear end of the coupling fork 1 has an extended portion 6 with an eye therein by means of which a universal connection is made with the frame 7 of the rear vehicle. This frame 7 extends rearwardly in the form of a fork as shown in dotted lines in Fig. 2 and is connected to the axles of the wheels 8 at points adjacent to said wheels. The universal connection between the frame of the rear vehicle and the coupling fork 1 may be made in any suitable manner as by a loop or snap 9 which connects with the eye-piece 6 before referred to. This form of connection is sufficiently loose to enable the bicycle to turn independently of the rear vehicle which is of course an indispensable feature. Suitably connected to the rear portion of the bicycle frame are two legs 10 which may be dropped to the ground on one side of the bicycle and thus made to support the bicycle in an upright position when the bicycle is not moving. These legs thus form supports and they may be elevated out of the way when it is not desired to use them as supports. In such elevated position the said legs come close together and are held up by a device or hook 11 which is secured on one side of the coupling fork 1.

Having described my invention, I claim:

A device for coupling a vehicle to the rear of a bicycle, comprising a coupling fork having an eye piece in its rear portion adapted to form a universal joint with a clip on the front portion of the vehicle to be attached, and the forward portion of said coupling fork having upright portions adapted to be rigidly secured to the rear horizontal fork of the bicycle frame, as herein shown and described.

In testimony whereof I affix my signature, in presence of two witnesses.

GEORGE T. SAMPSON.

Witnesses:
R. J. MCCARTY,
MATTHEW SIEBLER.